United States Patent
Blanchet

(10) Patent No.: US 6,668,507 B2
(45) Date of Patent: Dec. 30, 2003

(54) HURRICANE RESISTANT PRECAST COMPOSITE BUILDING SYSTEM

(76) Inventor: Paulin A. Blanchet, 5 Waterview Dr., Ocean Ridge, FL (US) 33435

(*) Notice: Subject to any disclaimer, the term of this patent is extended or adjusted under 35 U.S.C. 154(b) by 257 days.

(21) Appl. No.: 09/733,696

(22) Filed: Dec. 8, 2000

(65) Prior Publication Data

US 2002/0069602 A1 Jun. 13, 2002

(51) Int. Cl.$^7$ .................................................. E04B 5/04
(52) U.S. Cl. ........................ 52/601; 52/435; 52/375; 52/350; 52/349; 52/309.17; 52/309.16
(58) Field of Search ........................... 52/600, 601 O, 52/602, 434, 435, 309.16, 309.17, 367, 375, 344, 348, 349, 350

(56) References Cited

U.S. PATENT DOCUMENTS

| | | |
|---|---|---|
| 3,394,523 A | 7/1968 | Sackett |
| 3,555,763 A | 1/1971 | Bloxom |
| 3,724,157 A | 4/1973 | Miram |
| 3,952,471 A | 4/1976 | Mooney |
| 4,472,919 A | 9/1984 | Nourse |
| 5,119,606 A | 6/1992 | Graham |
| 5,678,372 A | 10/1997 | Thomson et al. |
| 5,761,862 A | 6/1998 | Hendershot et al. |
| 5,865,001 A | 2/1999 | Martin et al. |
| 5,884,442 A | 3/1999 | Breault |
| 5,987,827 A | 11/1999 | Lord |

*Primary Examiner*—Carl D. Friedman
*Assistant Examiner*—Yvonne M. Horton
(74) *Attorney, Agent, or Firm*—Malin, Haley & DiMaggio, P.A.

(57) ABSTRACT

A precast composite building system usable for walls, roofs, and floors of buildings, comprising a concrete composite panel element having embedded steel I-beams, wire mesh, embed plates, and steel tension reinforcement bars interconnected vertically, horizontally, and angularly by columnar elements rigidly fixed to the supporting foundation, embedded into the panel elements affixed to a transverse steel beam so as to form a perimeter tie-beam connection structure to which additional floor, roof, and wall elements are attached, forming a unitary, superior, load-bearing structure.

12 Claims, 25 Drawing Sheets

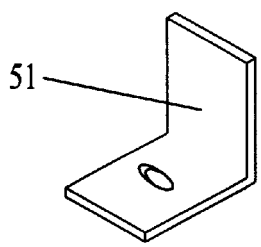
Figure 23
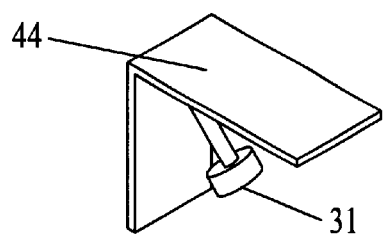 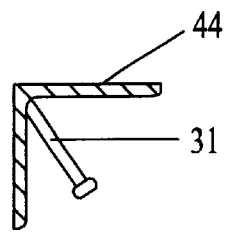
Figure 24    Figure 24A
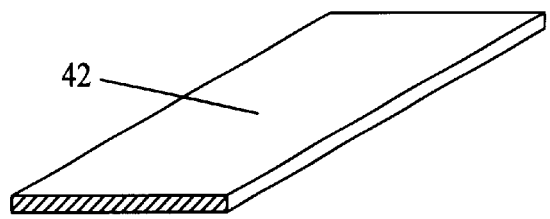
Figure 25

US 6,668,507 B2

HURRICANE RESISTANT PRECAST COMPOSITE BUILDING SYSTEM

BACKGROUND OF THE INVENTION

1. Field of the Invention

This invention relates generally to building construction and specifically to the construction of precast composite steel I-beam reinforced concrete panels and the method of interconnecting the precast panels to create floors, roofs and walls in a unitary integrated structure having high wind resistance and increased structural load bearing capabilities.

2. Description of Related Art

The advantages of reinforced concrete has long been known in the building industry, such as higher fire ratings and improved seismic and weather resistance. Concrete walls, floors and roofs have been commonly used in buildings, however pouring on site on forms built onto trusses or joists is slow and labor intensive. Thus, precast concrete building construction panels set into place and joined together to create a structure on site gained acceptance as a method to reduce the time, labor and material costs. The prefabricated panels, however, are not without problems if improperly prepared or installed. Without proper reinforcement or adequate joining of adjacent panels, cracking, questionable structural integrity, and diminished resistance to the forces of nature may result.

Many configurations have been employed utilizing prefabrication of concrete panels to construct buildings; for instance, U.S. Pat. No. 5,987,827 to Lord provides concrete panels formed utilizing a horizontal casting platform and having interlocking abutting joints. The structural integrity of the Lord system is provided wholly by the concrete and embedded reinforcement, requires integral wall panel footing and vibrator compactor for alignment, does not provide for prefabricated roof panels and requires multistory panels to be fabricated in one section thereby rendering the system impractical for off site construction and shipping.

The present invention described herein employs integral steel beams as a column in the wall panels, tilt up alignment adjustability independent of the footing design, continuous welded interpanel connection of steel S-beams forming a structural perimeter joining system, and provides for integral concrete roof panels which can accommodate multistory panel fabrication and transportation without much difficulty.

A precast panel interconnection system relying on concrete keys and keyways and which does not provide for prefabricated roof panels or multistory floor and wall panels is disclosed in U.S. Pat. No. 5,865,001 to Martin. The present invention does not utilize an interlocking panel construction.

U.S. Pat. No. 5,761,862 to Hendershot is a building system utilizing a connector assembly at the end of each panel spanning the vertical section of the panel corrugated edge and extruding steel reinforcement, precast corner sections, tongue and groove roof panel connections, integral precast footings, and structural tensions transmitted primarily by wire mesh and steel reinforcement. The present invention uses embedded steel plates welded panel to panel, even at the corners, the panel edges being beveled with no extruding steel, a continuous S-beam perimeter which accommodates structural tensions and shearing, conventional slab and footing construction, and no tongue and groove roof connection. In addition, the Hendershot system requires a post installation concrete pour while Applicant's system is wholly constructed on-site from prefabricated components.

U.S. Pat. No. 3,952,471 to Mooney teaches a precast concrete construction system with an integral concrete column structure included in the wall panels, an installation of protruding upright anchor bolts at the time of foundation construction and plates welded across panel joints for interpanel connections. The present system employs embedded S-beam column members in the wall panels, steel plate embeds or anchor bolts after panel installation and a continuous perimeter S-beam connection.

U.S. Pat. No. 3,724,157 to Miram incorporates complex architecture of removable fasteners and internal steel reinforced panels and plates welded across the panel joints. Miram requires existing structural framework to attach the precast panels to at installation and post installation of steel beams spanning the panel joints. The present invention uses steel S-beams embedded in the wall panels as integral column structures, a continuous perimeter S-beam connection, no pre-installation structure to support the wall panels, and welds plates between panels embeds.

U.S. Pat. No. 4,472,919 to Nourse details a monolithic composite panel construction based on embedded steel channels and does not address the construction of complete structures. The present invention herein is a method of constructing a building utilizing wire mesh reinforced concrete with embedded S-beam columns for use in constructing multi-story buildings interconnecting the same elements for wall, floor and roof components.

In U.S. Pat. No. 5,678,372 to Thompson a system of adjacent reinforced preformed panels are joined to one another at undulating confronting edges wherein alternating reinforcement bars are connected to an arrangement of elongated bars and a zigzag reinforcement bar by a wet knit joint completed by introduction of concrete. Although employable for floors, walls, and roofs like the present invention, the present invention uses welded steel plates to attach the bevel-edged (not alternating steel bar reinforced concave/convex segments) panels together, S-beams embedded in the wall panels as integral column structures, a continuous perimeter S-beam connection, and no concrete poured at time of installation.

BRIEF SUMMARY OF THE INVENTION

A precast building system and method comprising an integrated structural support panel or wall which provides an increase in structural load-bearing capacities and subsequent reduction in structural mobility as compared to existing precast and composite building systems. The resulting structural panels are not limited to use as bearing, retaining, shear and architectural walls, but can be used as floor and roof panels as well. Additionally, regardless of the particular structural application for a which a given panel is applied, the basic design of the composite panel remains the same, which yields improved efficiency in planning, design and construction. The floor panels can be cast with varying degrees of negative camber based on the size of the panel being cast, the element being flipped over after removal from the casting mold to accommodate for the camber so the panel will lay flat when used for a floor surface. The panels can be manufactured as precast or on-site cast, providing maximum efficiency in the logistical implementation of a construction project. Further, the system incorporates the longstanding advantages of precast construction techniques of arbitrary design shapes and rapid assembly while providing the improvement of an I-beam as both a continuous perimeter tie-beam enhancing load reinforcement and providing columnar support, unavailable for instance with a bar joist which would likely collapse when similarly used.

The composite steel beam-to-concrete panel provides for the use of a uniform structural element for all parts of a given structure, expediting the planning and erection phases. The system is manufactured as structural panels on site, or delivered by conventional transportation as precast panels to the construction site. Many of the characteristics of traditional precast panel construction are maintained, however, incorporation of the I-beam within the panel element constitutes a significant structurally advantageous difference in the forming, structural embedding, casting, handling, and erection of the elements as compared to traditional precast construction.

The building system is comprised of a concrete slab of about a 3-inch desired thickness and ranging up to about 50 feet in desired length, featuring an embedded S-shaped steel I-beam, conventional steel wire-mesh, embedded plates, and conventional steel tension reinforcement bars (deformed steel rods). The I-beam provides columnar and flexural support for wall, floor, and roof structures. When used as columnar supports, the embedded I-beams are welded or otherwise anchored to the foundation, and are also welded to the continuous perimeter S-shape I-beam tie beam structure. When employed as flexural members to support roofs or floors, the embedded I-beams are welded to the continuous perimeter S-shape I-beam tie beam structure. Adjacent wall, floor and roof panels are structurally connected with steel weld plates.

According to standard industry practices, a mold or form is constructed according to the panel element dimensions and support requirements. The component reinforcement, including but not limited to S-beam shapes, wire-mesh, tension bars and embed plates are fixed in place. Concrete of standard aggregate and post curing compressive strength, preferably a minimum of 3,000 psi, is poured, allowing sufficient curing time to achieve sufficient strength. The panel is then removed from the mold by a claw-like custom lifting technique, and is ready for transport or on-site erection.

A fundamental feature of the system is the manner in which the composite elements are interconnected to form an integral structure. The columnar element support beams embedded in the panels are welded or otherwise affixed to a transverse steel beam (tie-beam) which forms a continuous perimeter connection structure. The transverse beams can also serve as flexural support for floor and roof elements, e.g., withstanding bending loads imposed by the floor or roof panels, as well as providing structural integrity for wind resistance. In addition to this continuous perimeter flexural and tensile support structure, the columnar elements are rigidly affixed to the supporting foundation. Further, inter-element connections are formed at the panel interfaces to connect panels together, providing additional structural integrity. The resulting structure exhibits superior structural load-bearing characteristics in both compressive and tensile loadings, while providing maximum efficiency in construction expediency and overhead reduction.

The object of the invention is to provide a precast concrete I-beam reinforced panel which, when interconnected using the beams and embedded plates, is interchangeably usable for floors, walls, and roofs to construct a superior structurally load-bearing building which is cost and time efficient and resists most hurricane force winds.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 23 is a perspective view of the typical L-angle bracket used in panel connections.

FIG. 24 is a perspective view of the typical studded L-angle bracket used for foundation connections.

FIG. 24A is a side elevation view of the typical studded L-angle bracket used for foundation connections.

FIG. 25 is a perspective view of a typical weld-plate used for inter-panel connections.

DETAILED DESCRIPTION OF THE INVENTION

With reference to the drawings, the invention will now be described in detail with regard to the best mode and preferred embodiment. The present invention is the uniform precast steel I-beam reinforced concrete panel for walls, floors, and roofs and the method of interconnection of these panels on site to form a highly wind resistant integrated unitary structure.

Figure 2:
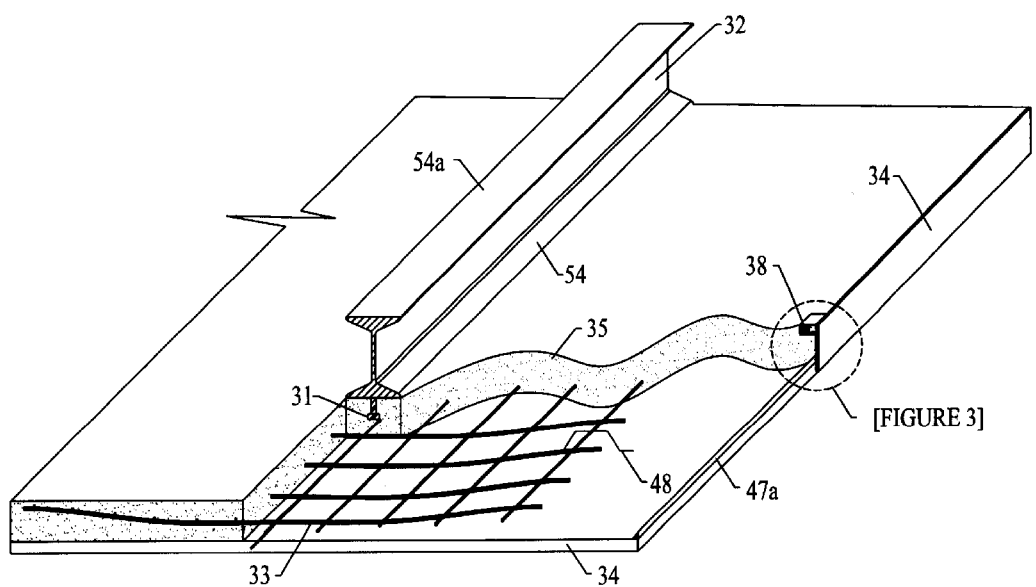
FIG. 2 is a perspective partial cross-sectional view of the finished element before removal from the mold.
Figure 3:
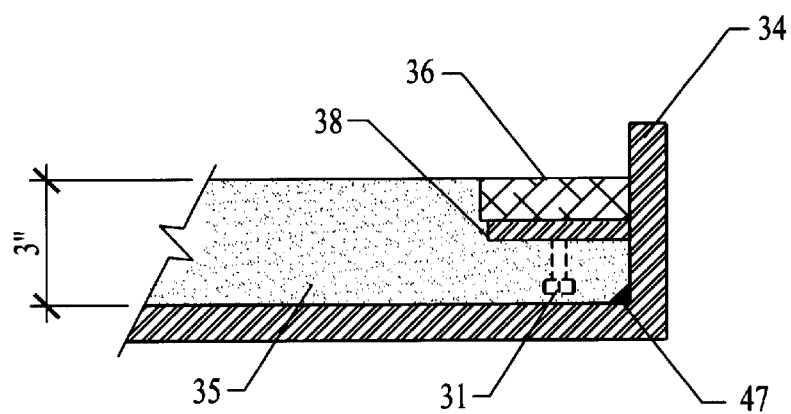
FIG. 3 is a partial side elevational cross-sectional view of the panel element mold and embed.
Figure 27:
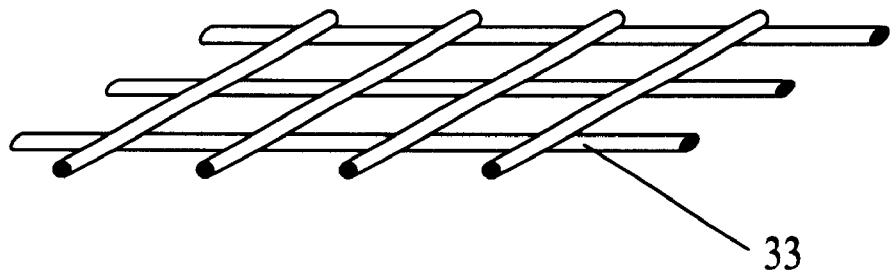
FIG. 27 is a perspective view of the typical wire-mesh reinforcement used in the panels.

The precasting of the panel 35 off-site, shown in FIGS. 2 and 3, consists of welding studs 31 to an S-shape steel I-beam 32 at about six-inch intervals, centered along the bottom flange 54 of the I-beam. Conventional wire mesh 33 is introduced into the mold 34 extending to the perimeter of the mold over which the S-shaped I-beam 32 is placed, each end of the I-beam resting atop opposing edges of the mold 34. The wire mesh 33 (shown in perspective in FIG. 27) is supported underneath by spacers 48 which raise the mesh off the bottom surface of the mold approximately one inch to allow for a reasonable amount of concrete cover over the mesh to reduce the potential of the mesh rusting due to the presence of moisture accumulated in the cement should the depth of the mesh within the slab be shallower.

Figure 1:
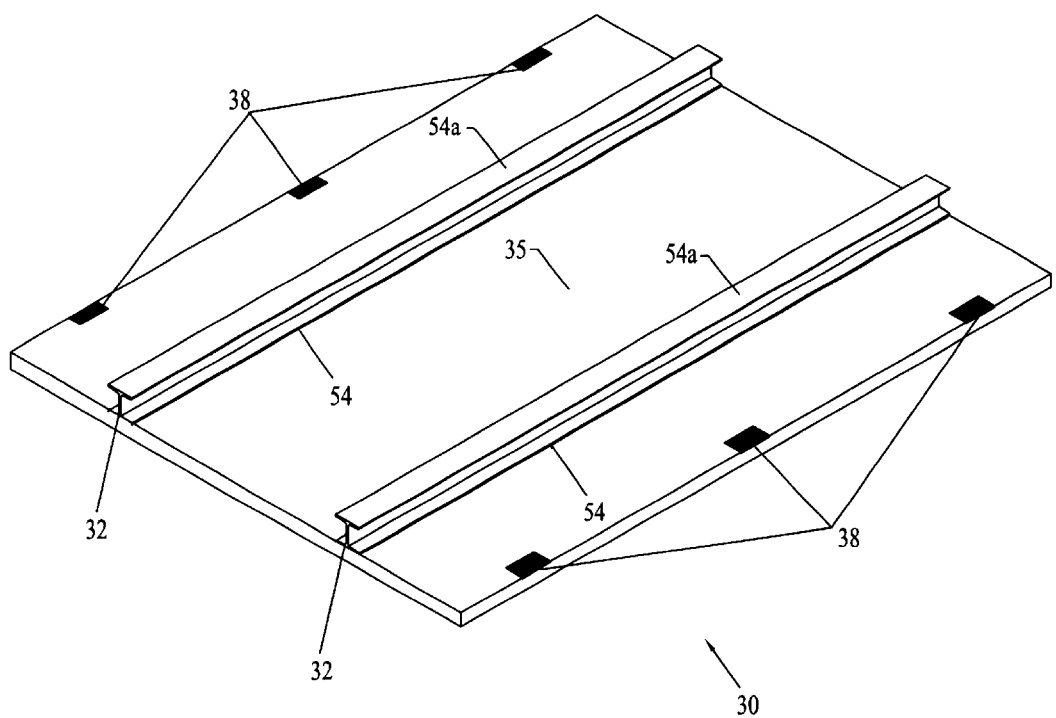
FIG. 1 is a perspective view of the finished composite element.
Figure 28:
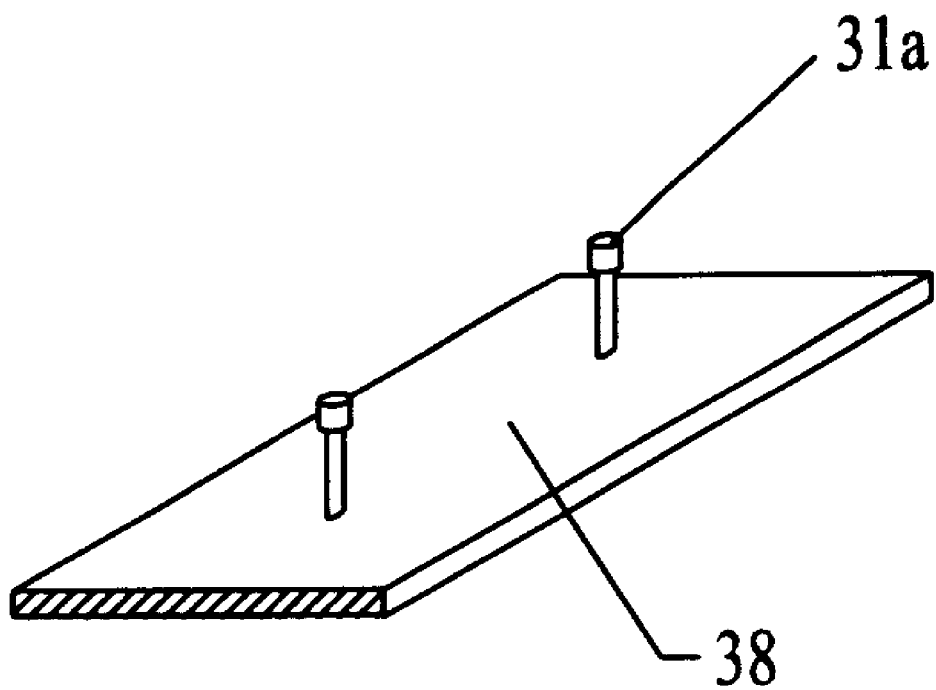
FIG. 28 is a perspective view of a typical studded embed plate.

Referring now to FIGS. 1 and 3, embed plates 38 with studs 31a (shown in FIG. 28) and rigid displacement blocks 36 are set in at intervals along the opposing longitudinal sides of mold 34. Concrete, preferably about 3,000 psi, however greater psi can be used, is poured in even layers into the mold 34 until the surface of the bottom flange 54 of each I-beam 32 is flush with the surface of the concrete, thereby embedding the I-beam studs 31, the wire mesh 33, studded embed plates 38, and displacement blocks 36 into the concrete to form a composite three-inch thick panel 35. The panel can range in width to about 50 feet and in length to about 50 feet, depending on structural requirements. One or more I-beams are spaced apart in parallel arrangement a maximum of 4 feet apart across the panel.

Figure 3A:
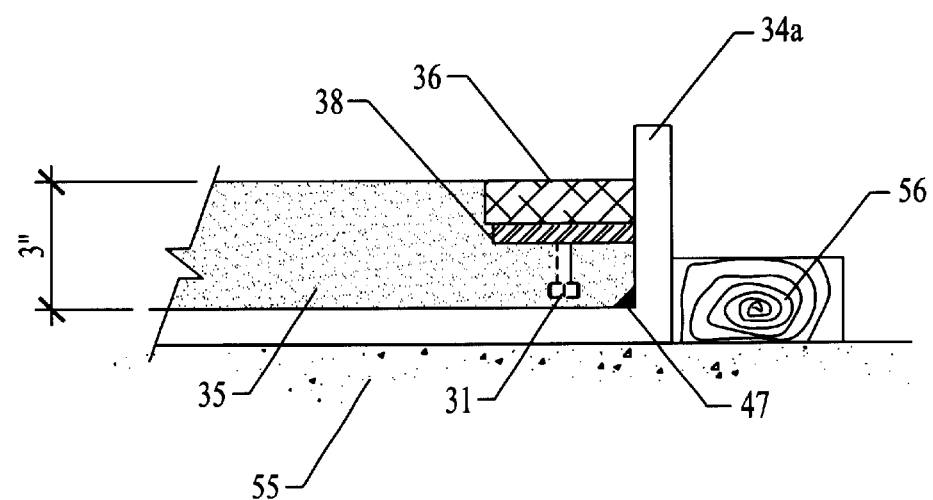
FIG. 3A is a partial side elevational cross-sectional view of the panel element mold and embed as used in an on-site casting of the system elements.
Figure 4:
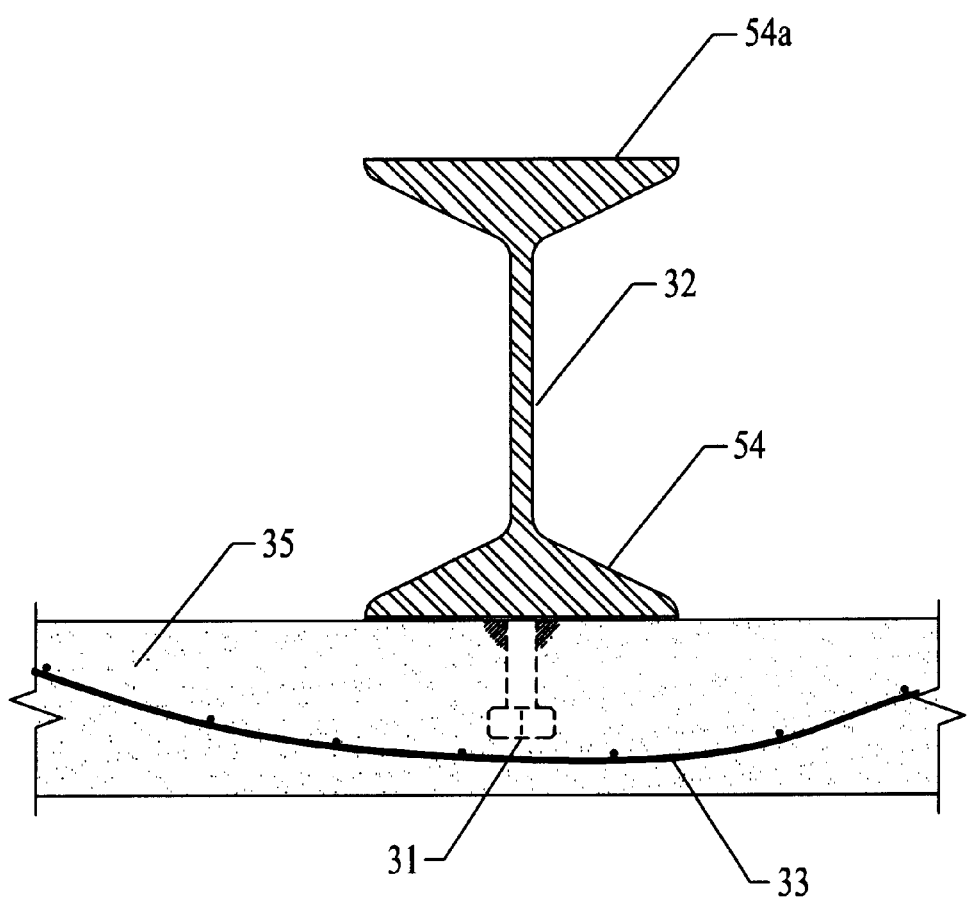
FIG. 4 is a side elevation cross-sectional view of the panel element.
Figure 5:
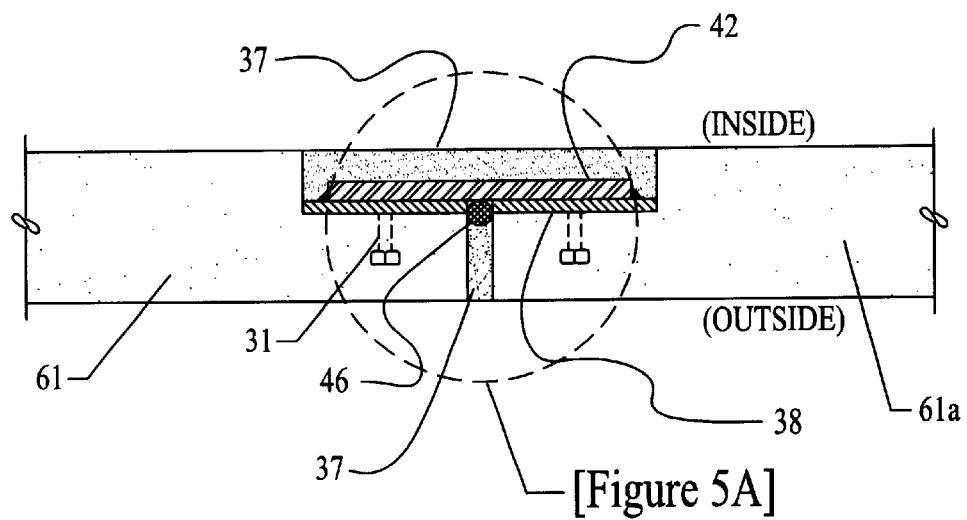
FIG. 5 is a side elevation cross-sectional view of the standard inter-element connection.
Figure 5A:
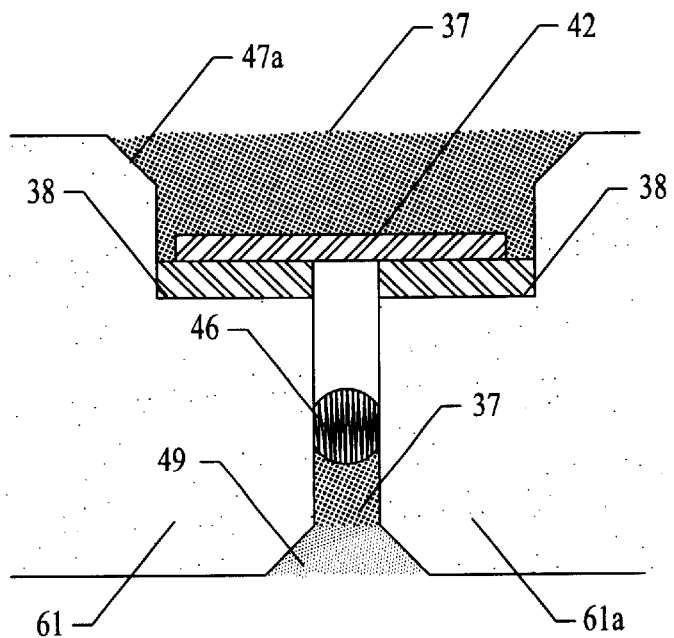
FIG. 5A is a side elevation cross-sectional view of two interconnected panels at the connection junction.
Figure 6:
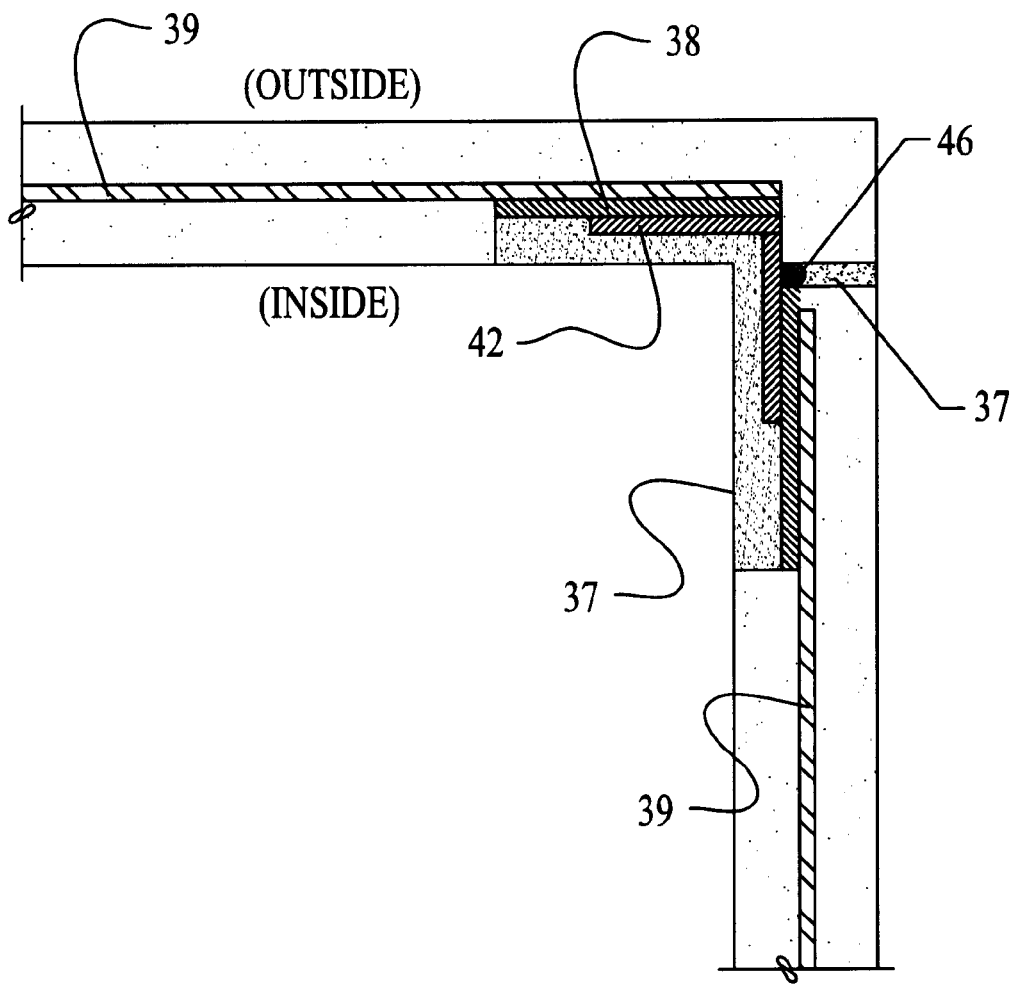
FIG. 6 is a top plan cross-sectional view of the standard inter-element corner connection detail.

In FIG. 3, the preferred embodiment is shown with a rigid displacement block 36, attached to the mold 34 to allow for lateral recesses containing steel embed plates 38. Spacing and dimension vary by application, however, it is preferred that the embed plates are about 12 inches from the leading adjacent edge of the panel at both ends with one or more embed plates spaced between as shown in FIG. 1. A steel weld plate 42, shown in closeup in FIG. 25, is welded across the embed plates 38 and connects the panels, then the recesses are filled with bonding cement 37 to form a continuous and uniform surface as shown in FIGS. 5, 5A, and 6. FIG. 3A shows how panel 35 is cast on site using a block of wood 56 to reinforce and stabilize the form 34a positioned on the existing foundation slab 55.

Figure 26:
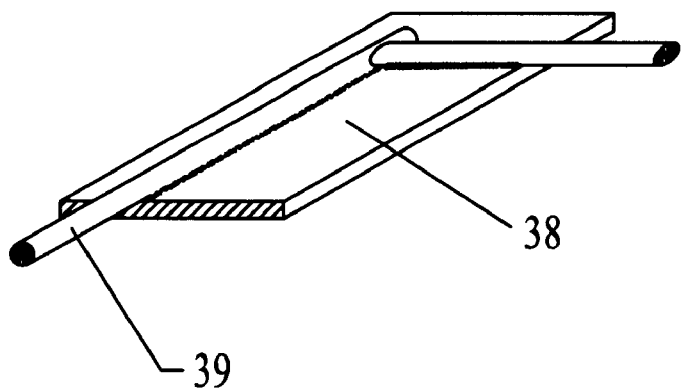
FIG. 26 is a perspective view of a panel embed plate with L-shaped steel embed rod.

In the wall panel corner connections, conventional reinforcement bars (rebars) 39, usually about 30 inches in length, are welded to the steel embed plates 38, forming an L-shape as shown in FIG. 26 before being introduced into the mold 34. The rebars 39 are positioned to extend away from the mold face at a 90 degree angle to provide embed plate 38 anchorage for corner connections shown in FIG. 6. Studs 31a on the embed plates 38 shown in FIG. 28 can be substituted for the rebar to hold the embeds in place.

Referring to FIGS. 2, 3, 3A, and 5A, the concrete is allowed to cure and is treated according to industry standards. Typically, all longitudinal leading edges are beveled 47a at about 45 degrees by placement within the mold of a longitudinal pyramidal rod 47 along the length at the junction between the bottom and side walls of the mold 34 or form 34a. The pyramidal rod 47 takes up space, preventing concrete from flowing into the mold edge region, creating an approximately 45-degree bevel on the edge of the panel element. The beveled edge 47a shown in FIG. 5A serves to create an increased surface area and bonding angle for the elastic joint grout weatherproofing.

Figure 7:
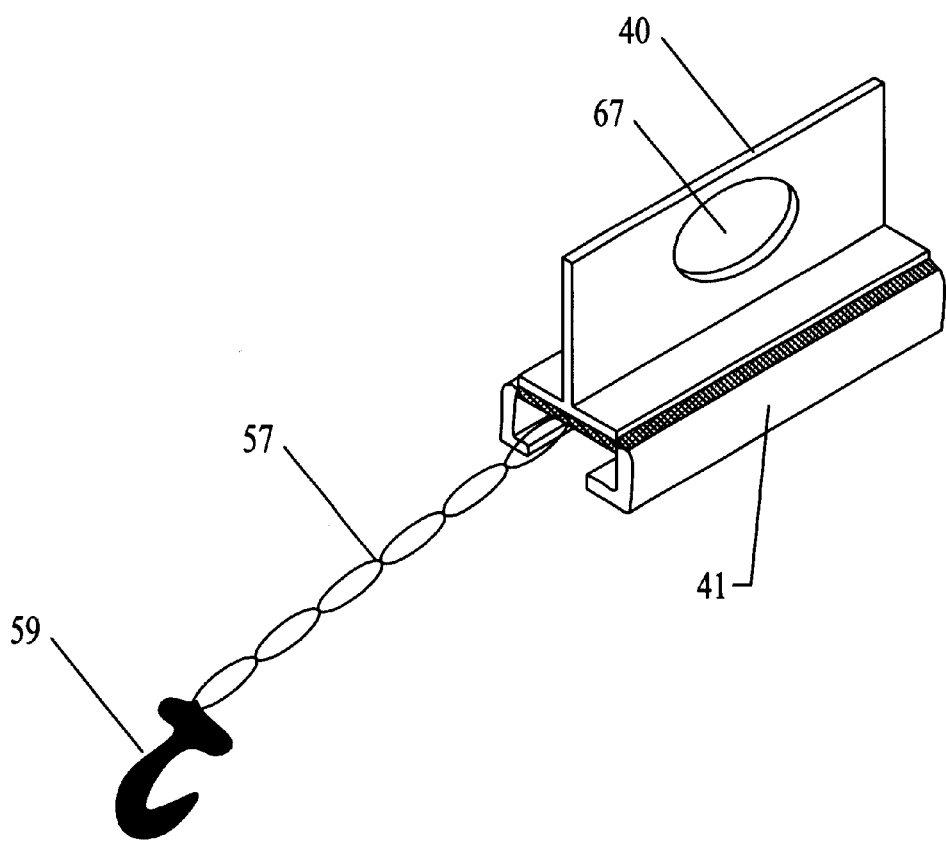
FIG. 7 is a perspective view of the panel element lifting apparatus.
Figure 8:
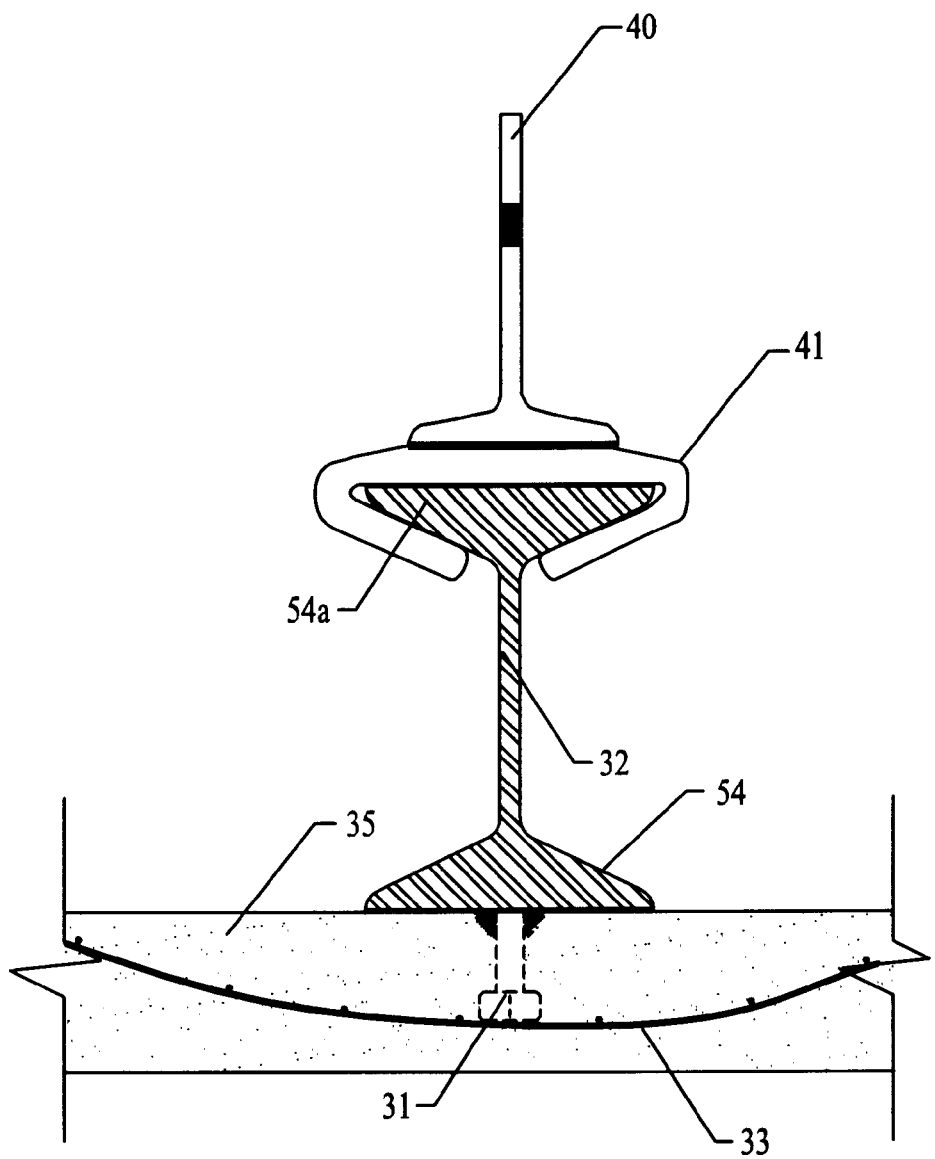
FIG. 8 is a side elevation cross-sectional view of the panel element lifting apparatus applied to the I-beam.
Figure 9:
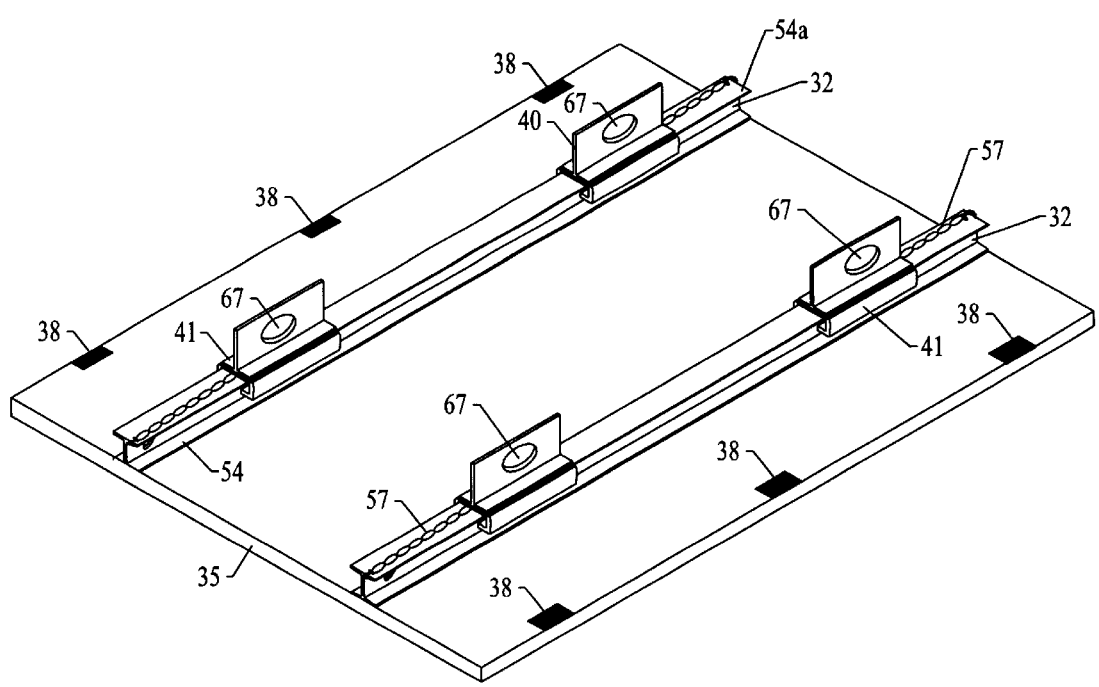
FIG. 9 is a perspective view of a panel element in preparation for lifting or removal from the mold.

In FIGS. 7, 8, and 9, the panel is lifted from the mold by the top flange 54a of I-beam 32 using a winch connected to the aperture 67 in the structural T-shaped bracket 40 on the U-shaped steel claw 41. Each claw 41 is secured in place using a chain 57 hooked to the top and bottom of the S-shaped I-beam 32 to keep the claw 41 from sliding toward the middle of the I-beam.

Figure 10:
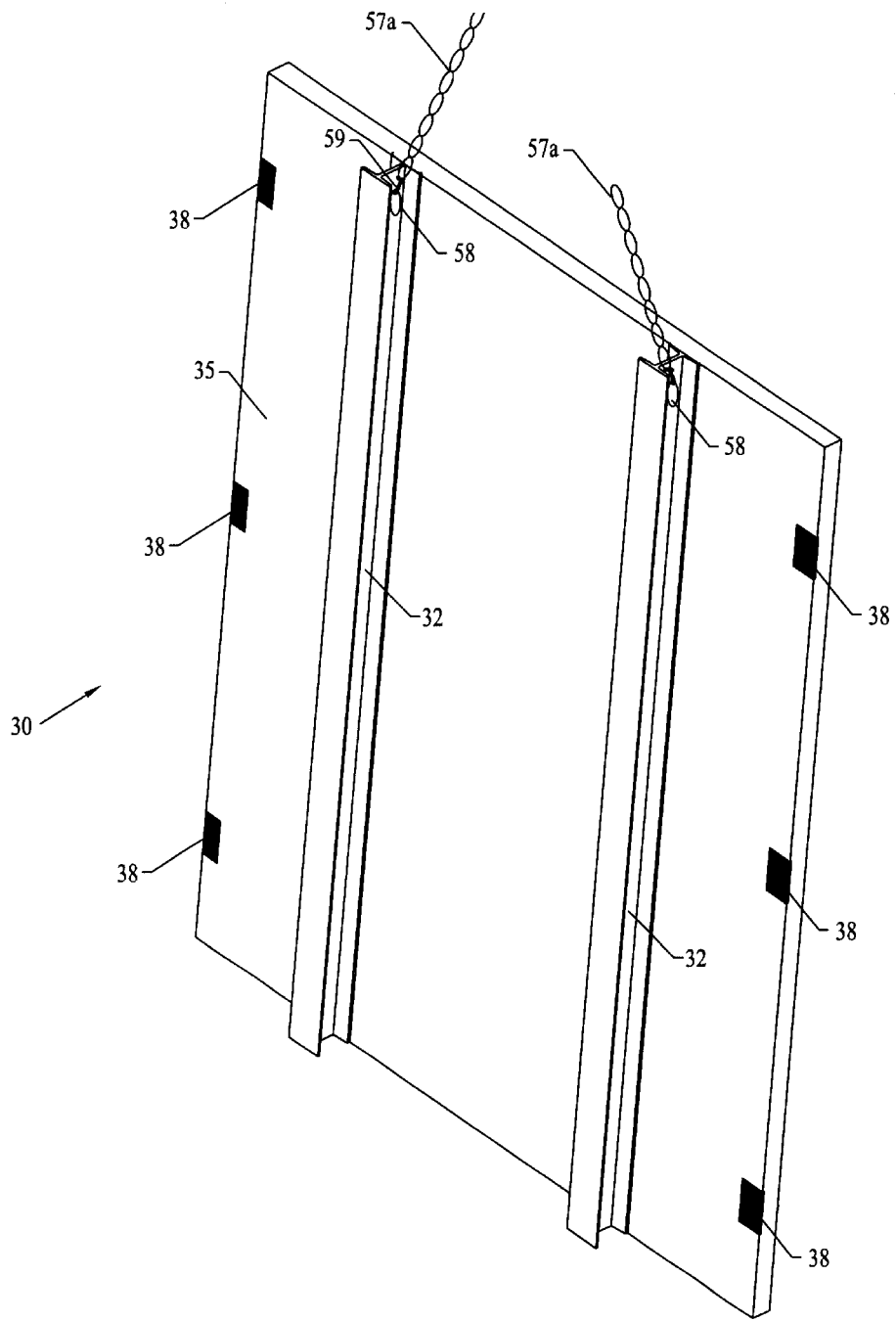
FIG. 10 is a perspective view of a panel element as in lifting or installation after removal from the mold.

In FIG. 10, the panel 30 is lifted, lateral and horizontal movements are assisted by lifting devices using chains 57a having J-hooks 59 inserted through an aperture 58 located at the upper end of the I-beam 32. Lifting, placing and basic erecting maneuvers of the panels 30 are similar for all uses, and is executed in a manner customary in the precast/tilt-up industry. Once lifted, the panel can be placed on any carrying means, such as a truck (not shown) for transport to the construction site.

In FIGS. 5, 5A, 6, and 13, two panels, 61 and 61a, whether to be along a planar side of the building or at a corner connection, are joined by aligning each set of two abutting embed plates 38 over which is welded a weld plate 42 to form a rigid connection between the two panels.

Figures 20, 20A:
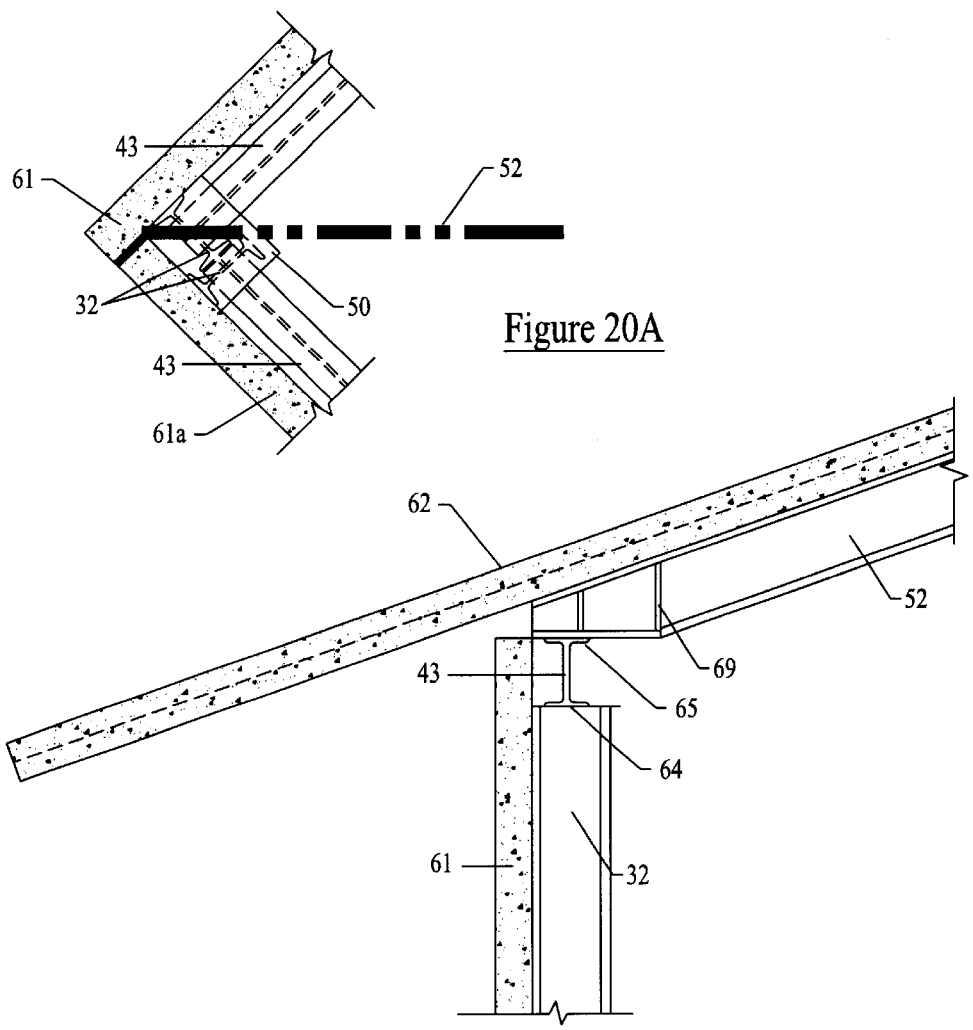
FIG. 20 is a side elevation cross-sectional view of the roof-to-wall panel connection along an exterior wall panel.
FIG. 20A is a top plan cross-sectional view of the roof-to-wall panel connection at wall corners.

FIG. 20A shows an alternate way of connecting wall panels 61 and 61a at a corner by a welding cap plate 50 over the junction of two columnar I-beams 32 and two tie-beams 43.

Figure 11:
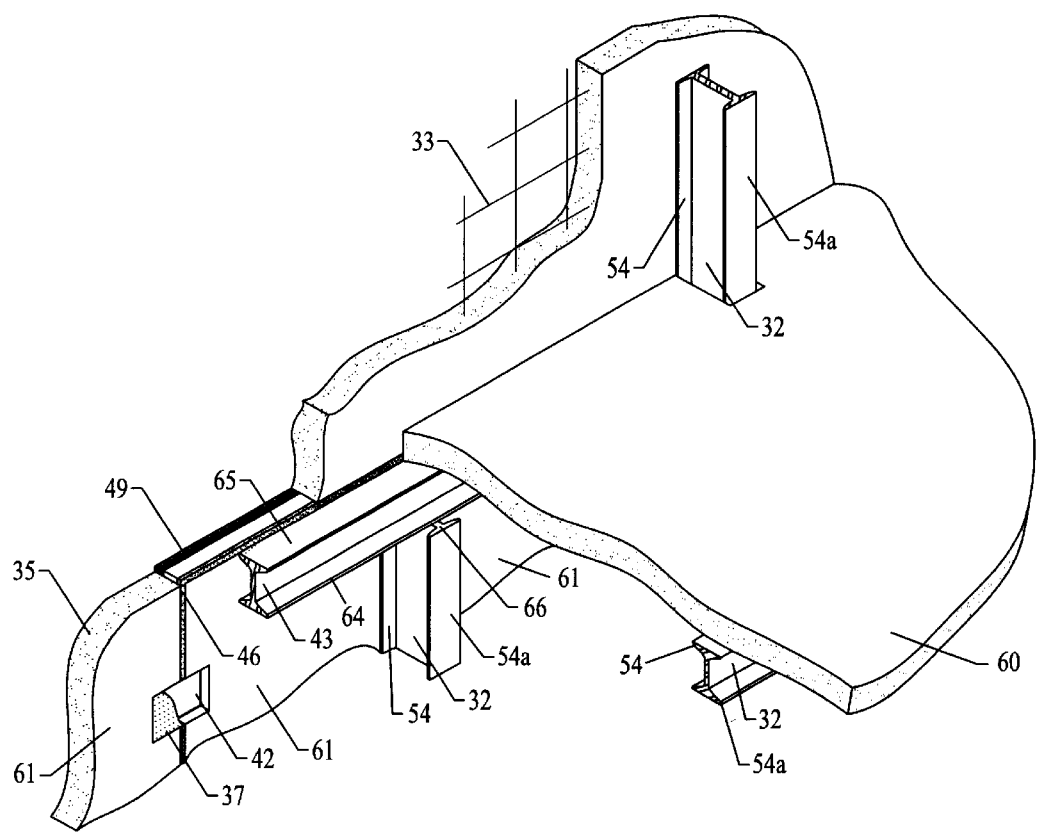
FIG. 11 is a perspective cross-sectional view of a junction of two lower story wall panels, one upper story wall panel, and a floor panel.
Figure 22:
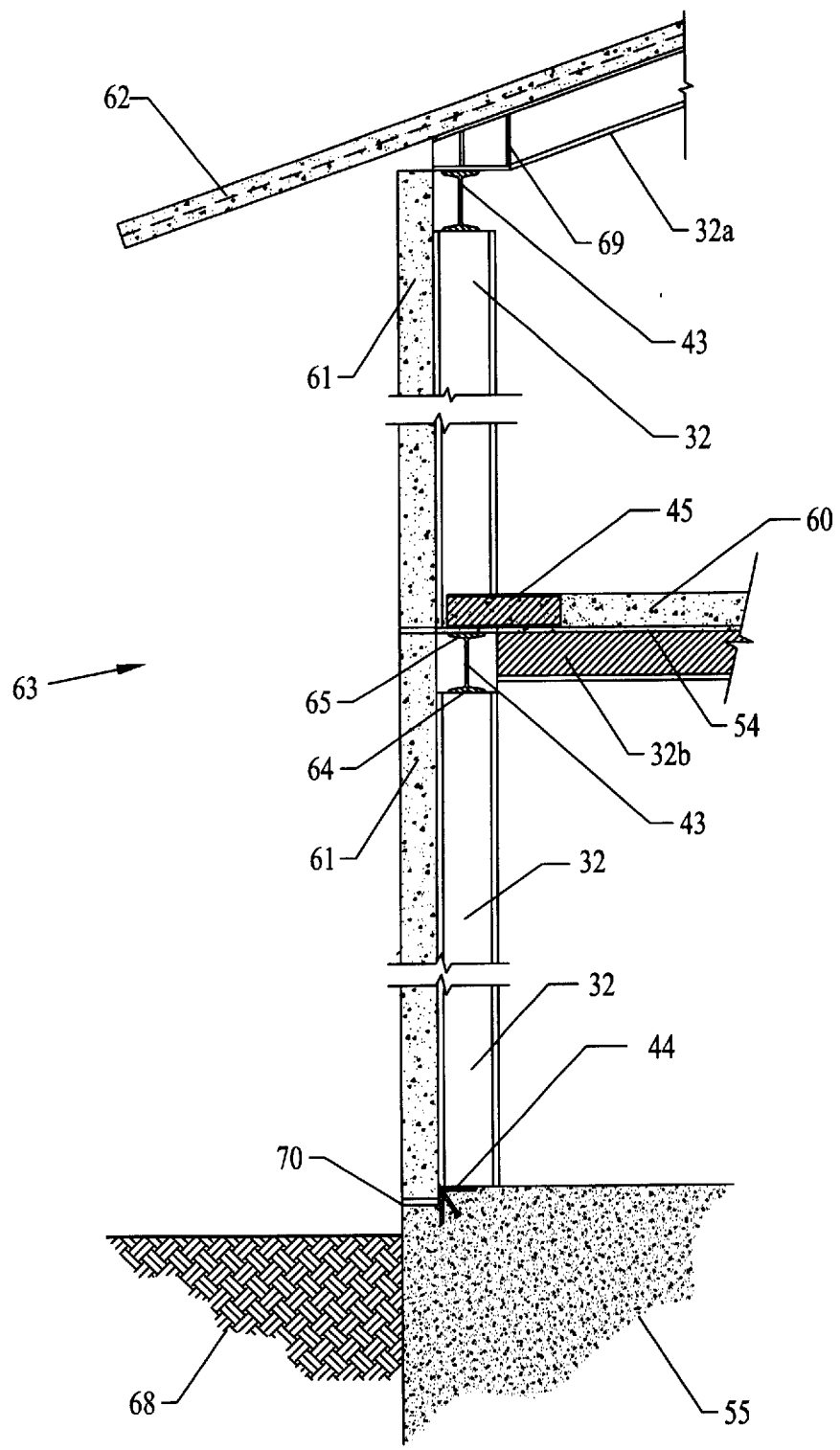
FIG. 22 is a cross-sectional side elevation view of the entire structure.

In FIGS. 11 and 22, the vertical wall panels are tied together by means of a continuous tie-beam 43 welded at bottom flange 64, positioned perpendicular to, and on top of, the cross-sectional end of columnar I-beams 32 embedded within the composite wall panels 61. In FIGS. 13, 14, 15, 16, and 22, the wall panel 30 is positioned on the foundation 55 with the base of the columnar I-beam aligned with a studded base plate 44, the structural concrete slab 35 of the panel 30 is positioned on foundation ledge 70 which is present on the perimeter of the foundation. This assures that the panel I-beam columns 32 carry the structural load of the building. Any gaps or crevices between the panel 30 and the foundation ledge 70 are filled with bonding cement 37. The bases of such columnar I-beams in wall panels 61 are welded or bolted to studded base bracket 44, shown in closeup in FIGS. 24 and 24A, embedded afoot each of the vertical S-shaped I-beams into the structural foundation 55. Alternatively, the I-beam 32 can be secured with a steel L-angle bracket 51 welded to the web of the I-beam at the base. The typical L-angle bracket 51, shown in closeup in FIG. 23, is bolted to the foundation 55 using standard anchor bolts.

Figure 17:
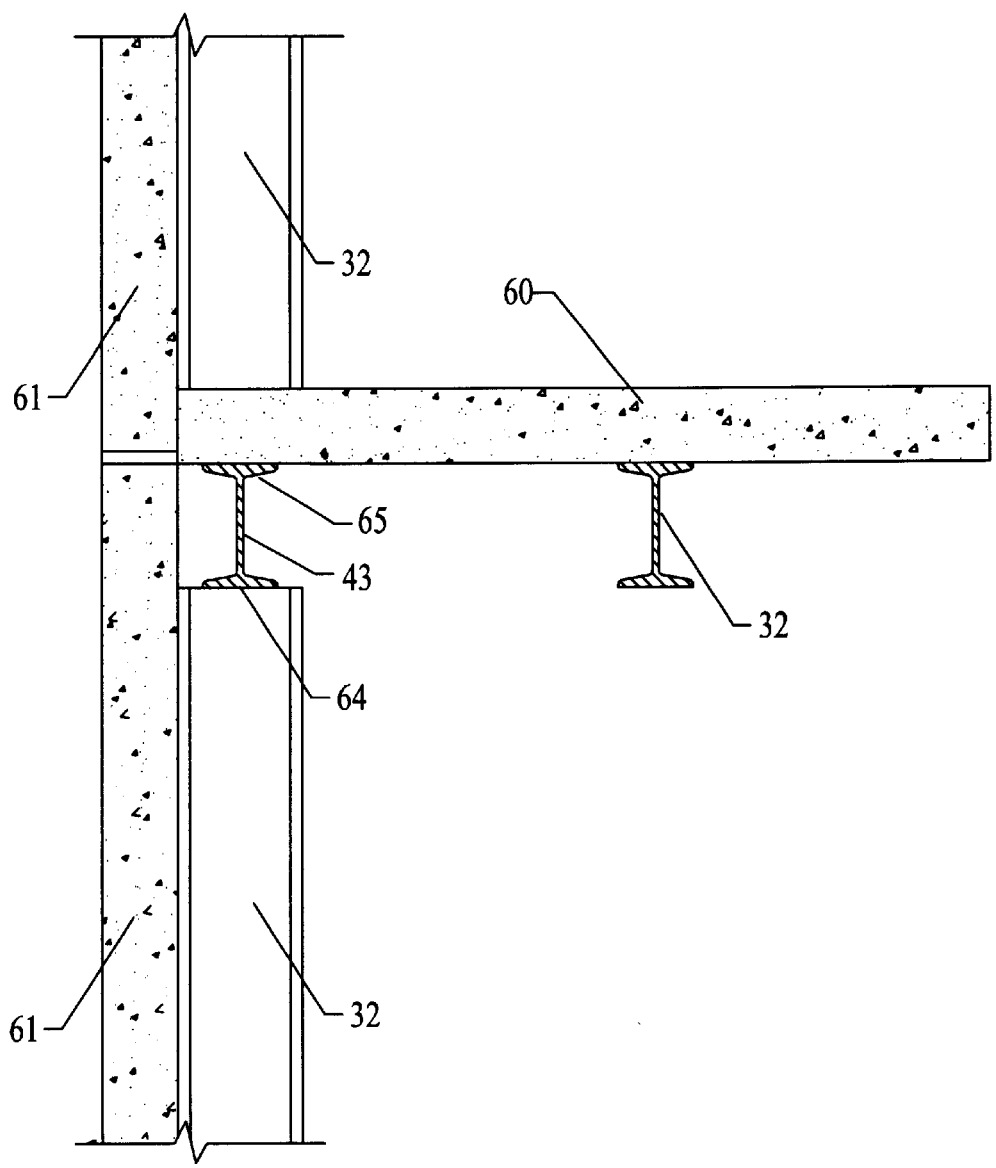
FIG. 17 is a side elevation cross-sectional view of the wall-to-floor panel connection with floor panel beams parallel to wall.

The horizontal panels, e.g., floor panels 60, which have embedded I-beam supports perpendicular to the continuous wall perimeter tie-beam 43, are supported at the end walls by welding a shoe 45 on the top of the flange 54 of floor panel I-beam 32. The shoe 45 is typically about a nine and one-half inch long and three-inch deep S-shape, which is attached through longitudinal welds along the panel's I-beam flange. The standard weld length is about six inches and the bearing depth is about three and one-half inches. The top flange of the shoe 45 is flush with the top surface of the floor panel 60 and the shoe 45 is fully embedded into the concrete. The shoe is then welded to the continuous S-shape tie-beam 43 shown in FIGS. 12, 18, and 22. For floor panel with embedded I-beams which span the direction parallel to the continuous tie-beam 43 as seen in FIGS. 11 and 17, the floor panel 60 contains an embed plate which is welded to the top of the tie-beam.

Figure 19:
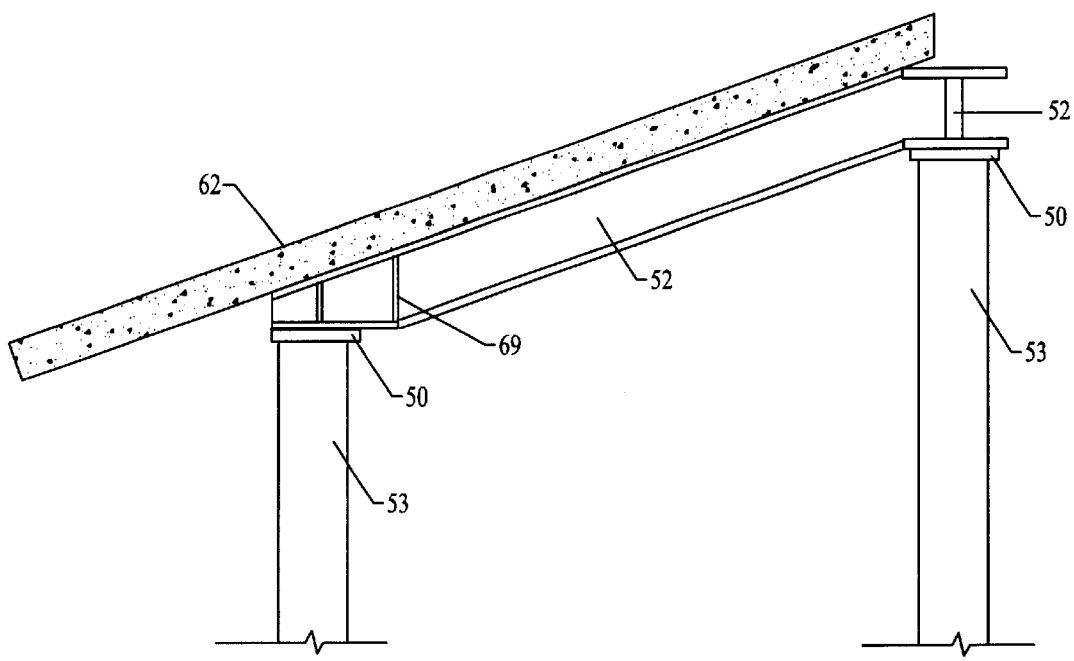
FIG. 19 is a side elevation cross-sectional view of a structural steel frame for floor/roof panel bearing.
Figure 21:
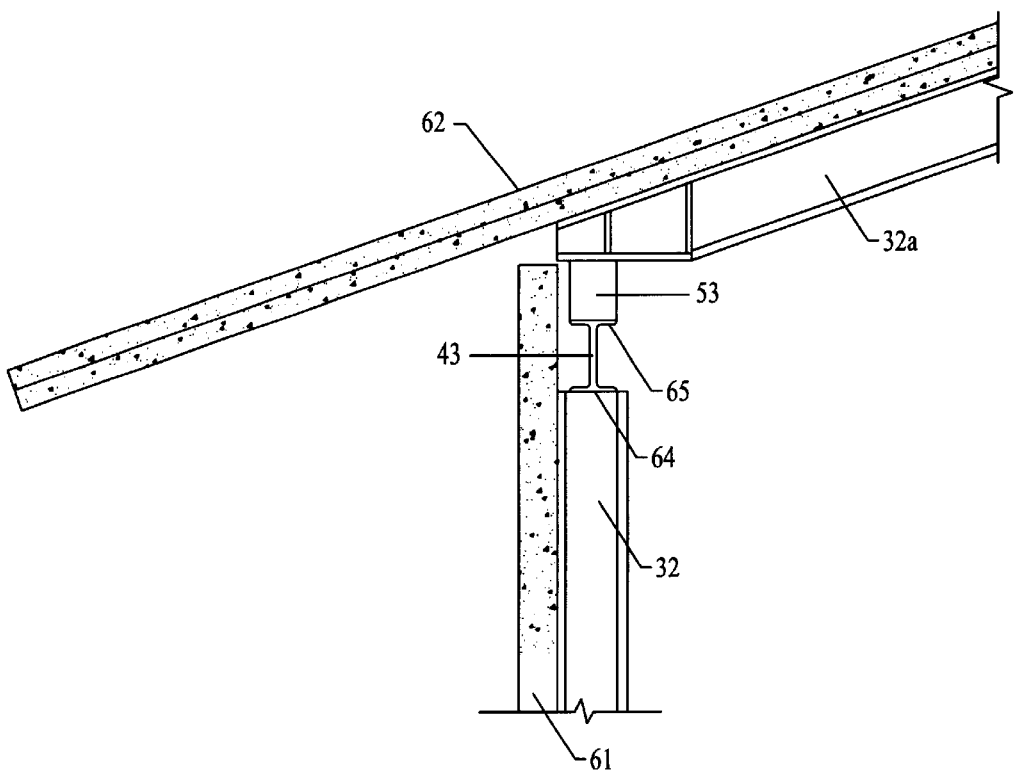
FIG. 21 is a side elevation cross-sectional view of the roof-to-wall panel connection along exterior walls.

Referring now to FIGS. 19, 20, 20a, 21, and 22, a structural support matrix of tubular steel shapes 53 and W-shape I-beams 52 can be erected to form a support structure for floor and roof elements. The W-shape I-beams 52 are not embedded in the panels, but act as truss elements. FIG. 20A illustrates a corner connection between two wall panel elements 61, a cap plate 50 is welded over two cornering continuous tie-beams 43. In FIGS. 19, 20, and 21, an inclined W-shape I-beam 52, having vertical web stiffeners 69, is miter cut and welded flush on the cap plate 50. Along the interior wall element sections, a tubular steel column 53 may be welded in place on the upper flange 65 of the continuous tie-beam 43 to provide sufficient height and bearing support for the W-shape steel beams 52.

In FIGS. 5, 5A, and 6, a filler rod 46 with sealer applied thereon is inserted to fill the gap between abutting panels. In succession, the remaining void space is then filled with filler cement 37 to about one-third of the joint depth and enclosed to the outside by impervious permanently elastic joint grout 49.

When casting the panels 35 on site, as shown in FIG. 3A, all of the above applies, however, instead of using an oil-treated prefabricated steel mold, a form 34a is set up in which the concrete is cast. The concrete may be poured onto an existing floor slab 55 that has been treated with form oil.

Figure 14:
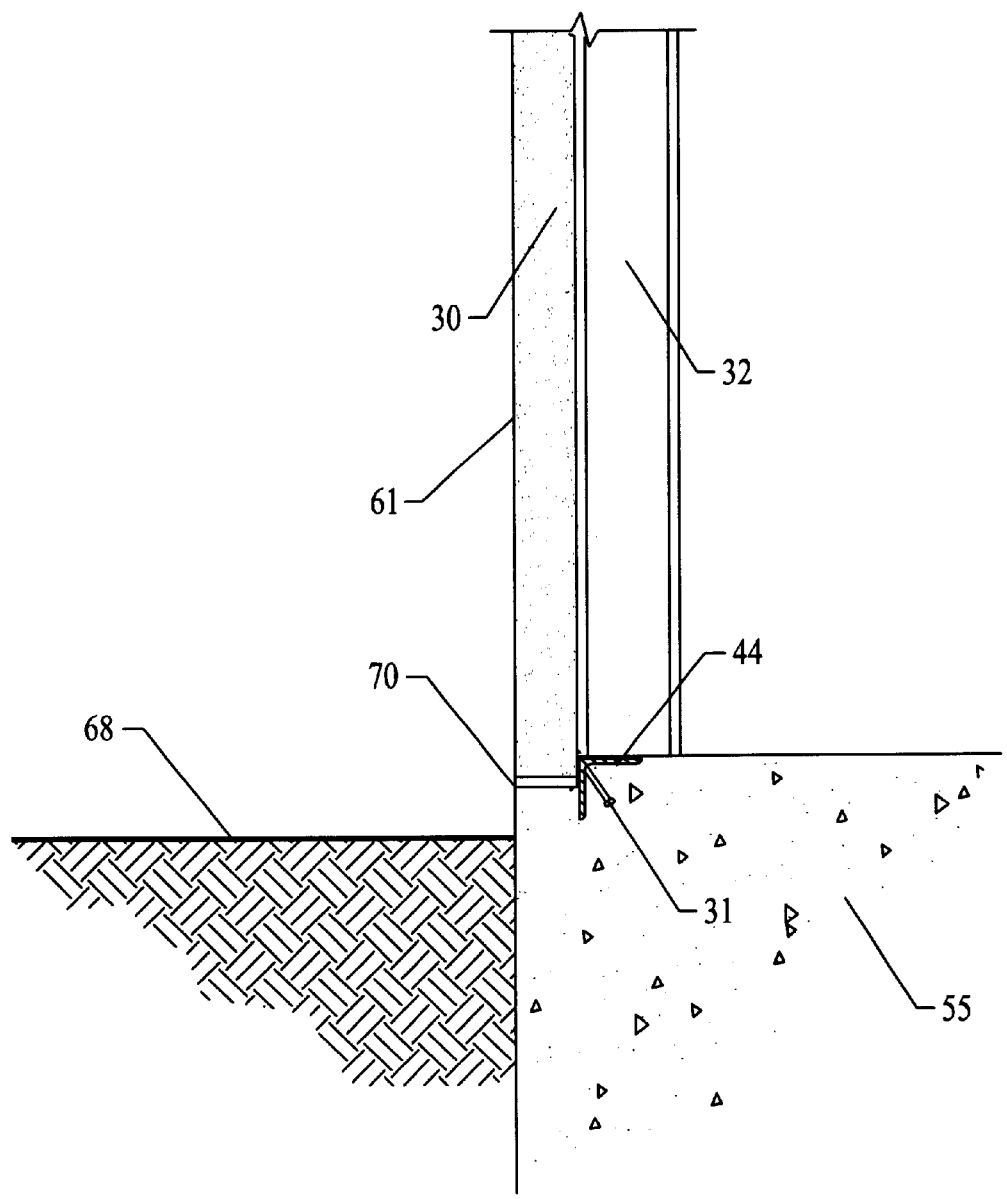
FIG. 14 is a side elevation view of a wall panel and foundation connection.
Figure 15:
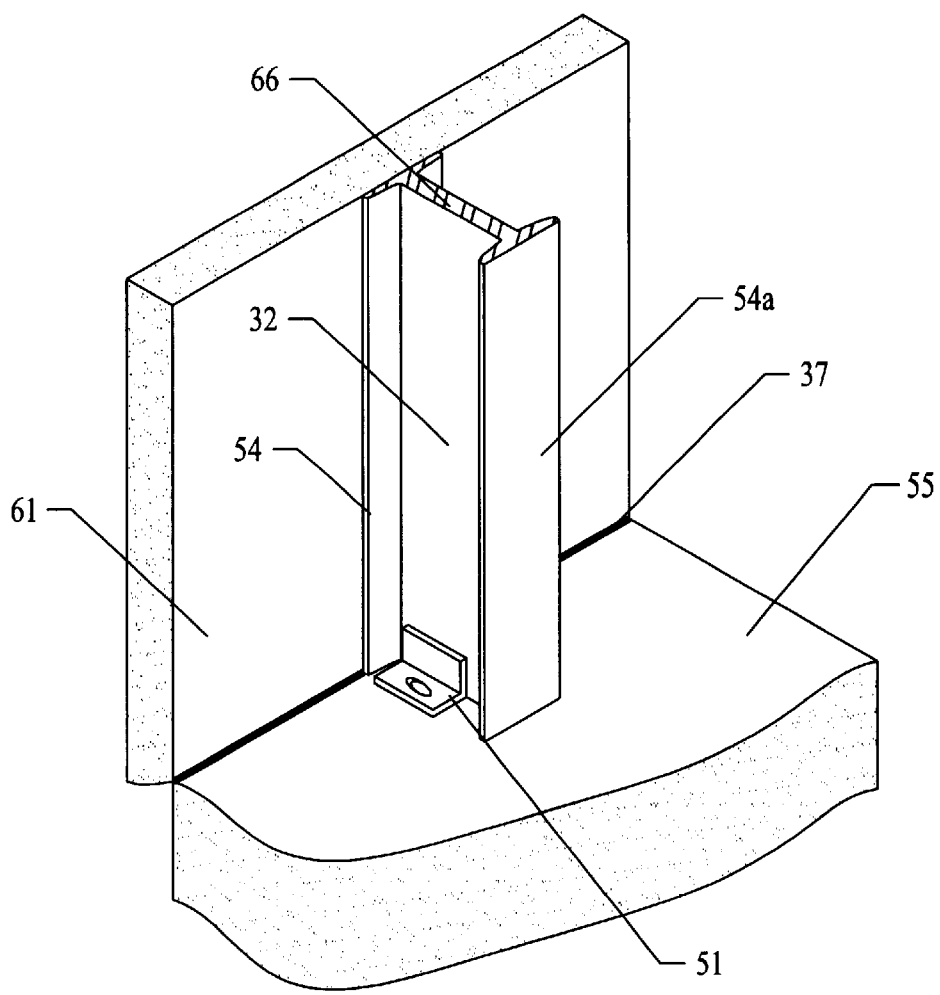
FIG. 15 is a perspective view of an alternate embodiment of a panel foundation connection.
Figure 16:
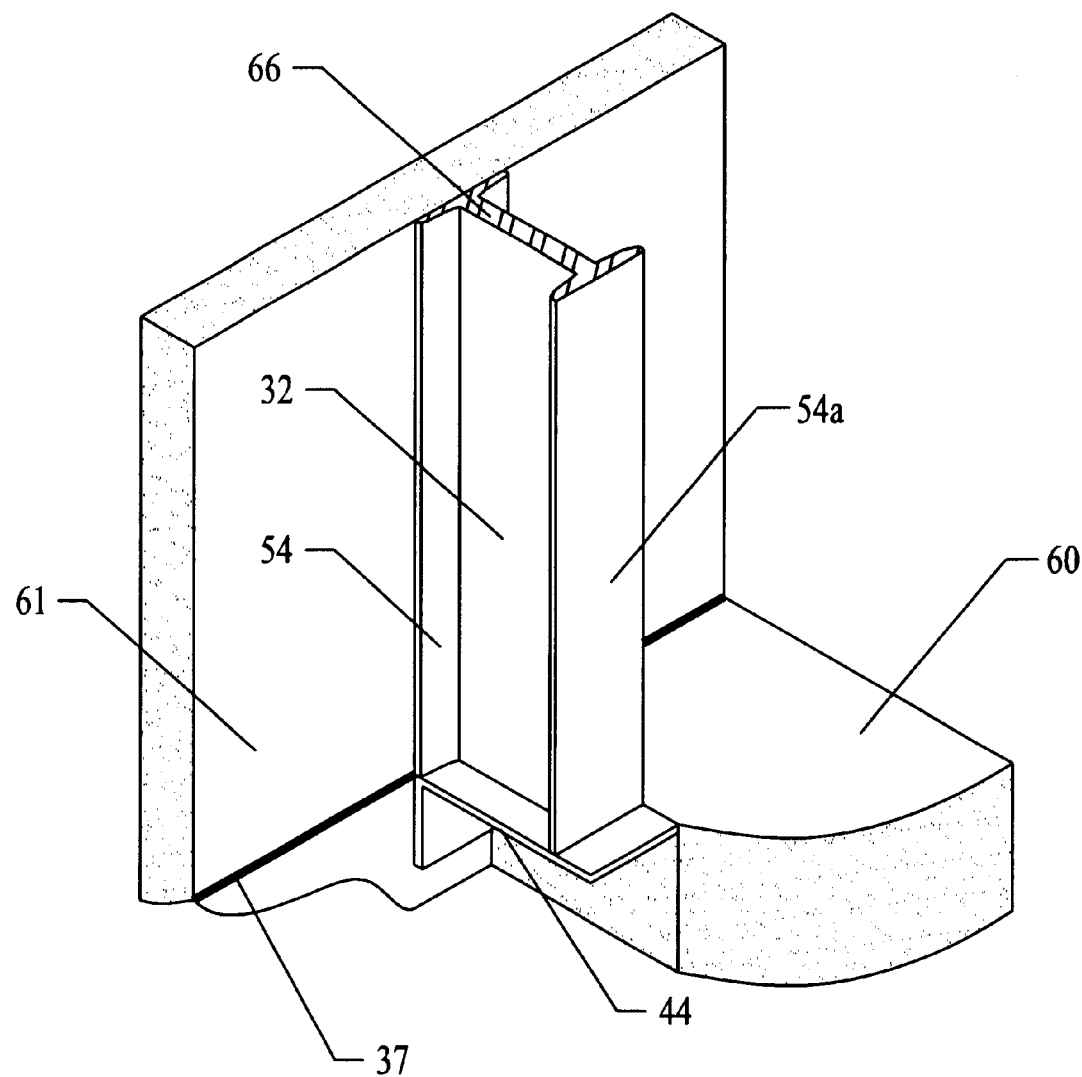
FIG. 16 is a perspective view of the preferred embodiment of a panel foundation connection.

Once a suitable structural foundation 55 is in place, preferably with embed plates, the wall panels may be installed. The embed plates 38 are set in the foundation concrete at the time the foundation is poured along the periphery of the foundation edges where wall panels are to be installed as shown in FIG. 14. The typical embed spacing is 48 inches. The wall panels 35 depicted in FIG. 10 are lifted by a crane (not shown) and positioned for installation above the ledge 70 of foundation 55 with the wall panel embedded columnar I-beam aligned with, and resting directly on, the exposed foundation embed plate as seen in FIG. 14. The panel is secured in place by industry standard tilt-up panel bracing. The columnar embedded I-beam 32 is then welded directly to the studded base plate 44 on the existing foundation, as shown in FIG. 14 or, alternatively, as shown in FIG. 15, the I-beam may be welded to an L-angle anchor plate 51 which is secured to the foundation 55 with standard expansion bolts. This process is repeated for all first floor wall panels.

Figure 13:
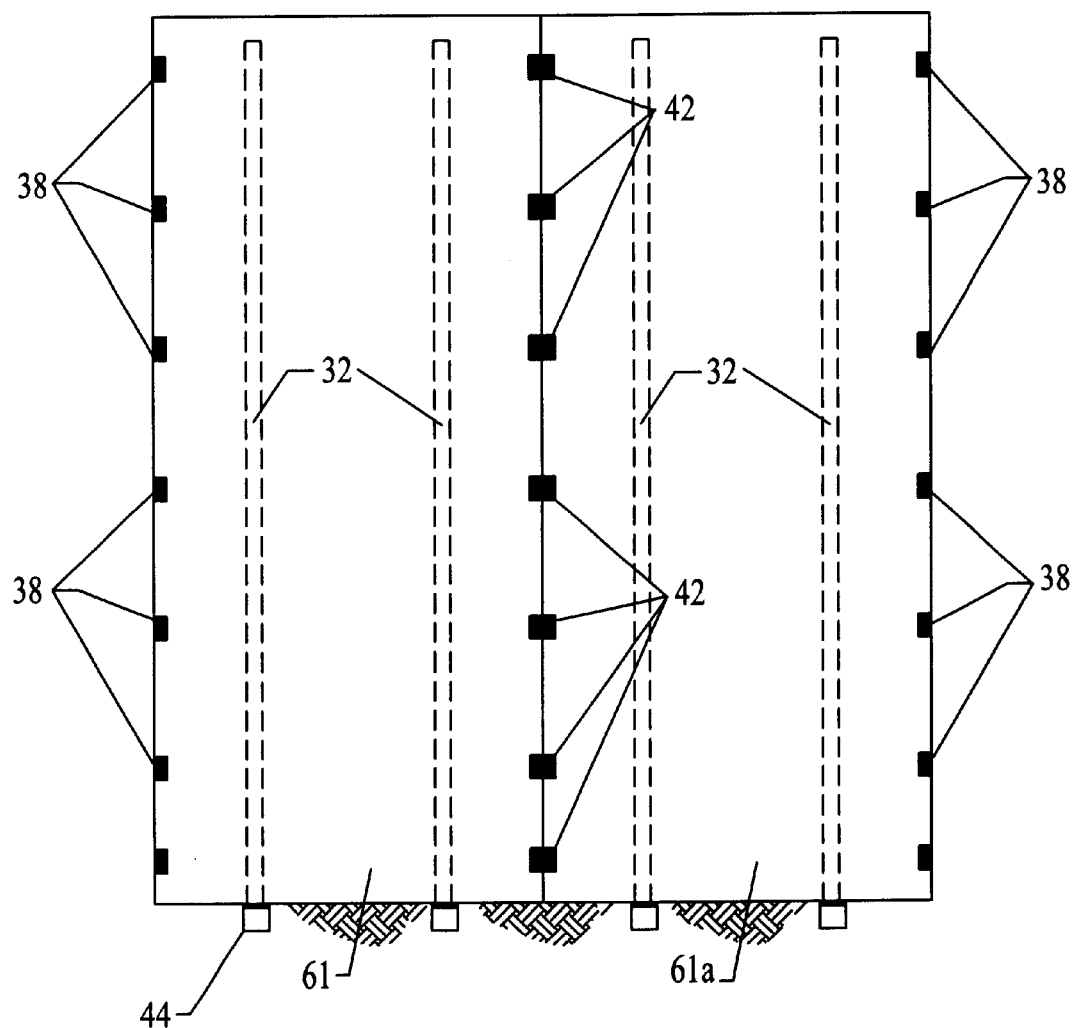
FIG. 13 is a side elevation view of joined wall panels.

Referring to FIG. 13, adjacent wall panels 61 and 61a are then structurally connected with steel weld plates 42 which span the adjacent panel-to-panel embed plates 38 located along the vertical edges of adjacent panels. At places where adjacent wall panel elements form a corner, steel weld plates 42 are fully welded to embed plates 38 set in the interior corners of the wall sections, as well as being fully welded to each other to form a corner connection as seen in FIG. 6.

A continuous tie-beam 43 is then fabricated by installation of S-shape steel I-beams transverse to, and along the top of, the wall panel columnar embedded I-beams 32. The tie-beam connection is achieved by directly welding the bottom flange 64 of the tie-beam 43 to the top cross section 66 of the panel embedded I-beam as shown in FIGS. 11, 17, 18, 20, 21, and 22.

Figure 12:
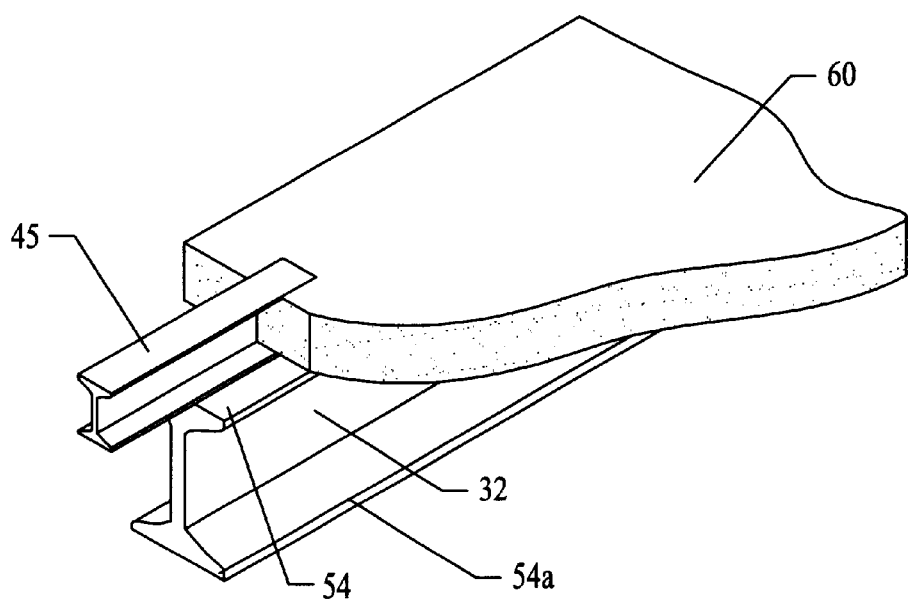
FIG. 12 is a perspective cross-sectional view of the floor panel and connection shoe.
Figure 18:
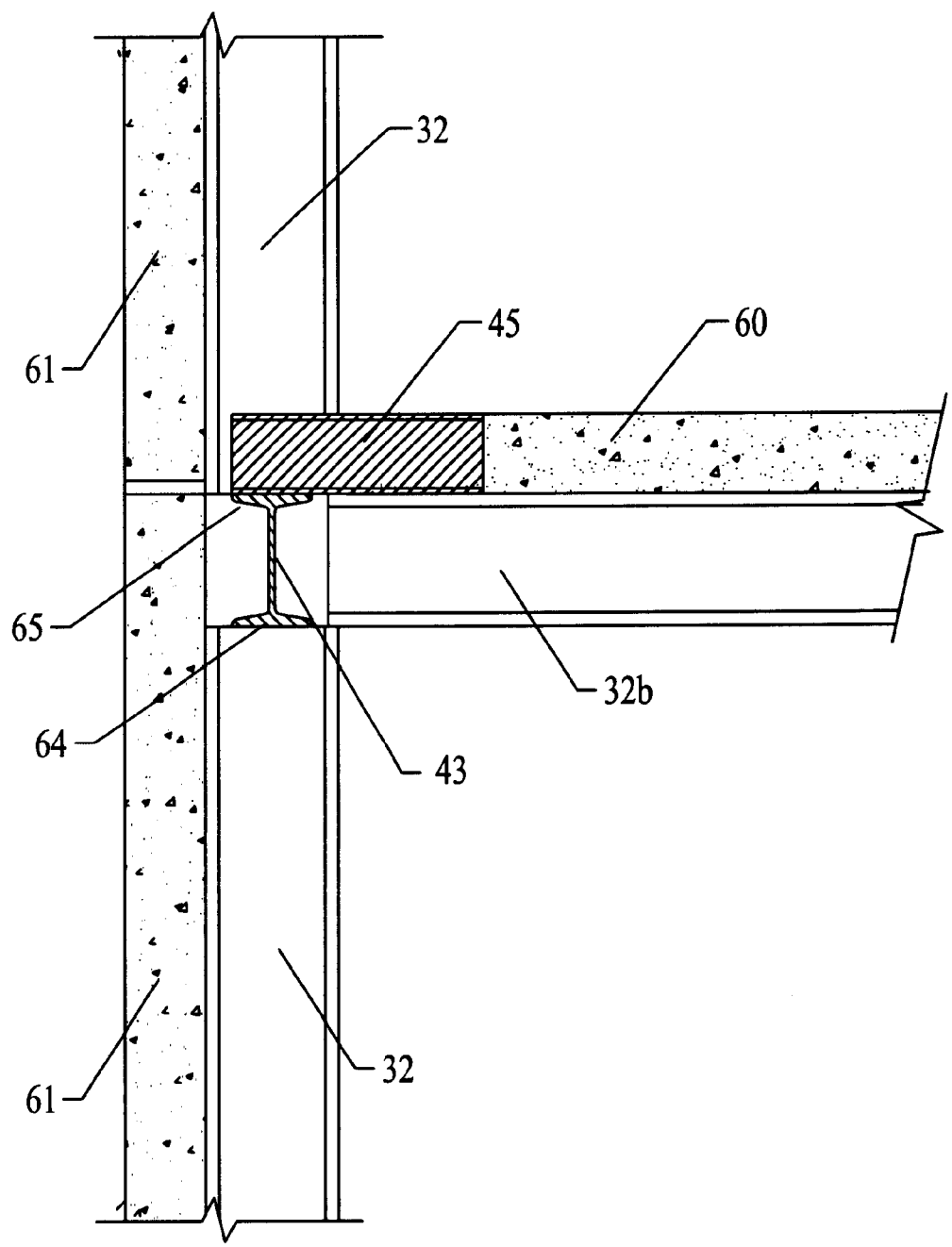
FIG. 18 is a side elevation cross-sectional view of the wall-to-floor panel connection with floor panel beams perpendicular to wall.

Referring now to FIGS. 12, 18, and 22, once the continuous perimeter tie-beam 43 is installed, the second floor panels can be installed. The floor panels are set into place with the floor panel embedded I-beam shoe 45 resting on the tie-beam. The floor panel shoe 45 is then welded directly to the top flange 65 of the tie-beam 43. Adjacent floor panels 60 are structurally connected by steel weld plates 42 or rods 39 which are welded across embed plates 38 set along the peripheral edges of adjoining floor panels. Once the floor panels 60 are installed, the wall panels 61 are lifted into place on the second floor and secured with industry standard temporary bracing (not shown). The wall panels 61 are aligned on the second floor such that the wall panel embedded columnar I-beam 32 is directly above the continuous perimeter I-beam 43. The wall panel embedded I-beams 32 are then directly welded to the top flange 65 of the continuous perimeter I-beam 43. Once the wall panels 61 are in place, adjacent wall panels 61a are structurally connected with steel weld plates 42 across the wall panel embeds 38 set along the vertical edges of adjoining panels as shown in FIG. 13. A continuous tie-beam 43 is then fabricated for the walls on the second floor (or any multiple upper floor) by installation of S-shape steel I-beams 32 transverse to, and along the top of, the second floor wall panel columnar embedded I-beams as shown in FIG. 22. The bottom flange 64 of the tie-beam 43 is directly welded to exposed cross-sectional top edge 66 (shown in FIG. 16) of the embedded columnar I-beam 32.

The installation of roof panels may proceed once all the upper floor wall panels are fully installed. Depending on the particular architectural details of the roof panel placement, two methods are employed to support the roof panel elements. In the case wherein the lower section of a roof panel rests on a wall panel, the roof panel embedded I-beam 32a may rest directly on the perimeter tie-beam 43 as depicted in FIG. 22, the roof panel I-beam being directly welded to the tie-beam 43 top flange 65. In the situation where the wall panel extends above the height of tie-beam 43 top flange 65, a structural steel tubular shape 53 is used as a column support between the tie-beam 43 and roof panel I-beam 32a as shown in FIG. 21. The columnar support is fully welded at both the tie-beam flange 65 and the I-beam flange.

Referring now to FIGS. 19 and 21, in the case where the roof panel 62 cannot rest on an exterior wall panel, a tubular steel column 53 is positioned and affixed to the foundation to support the roof panel. The column has a steel cap plate 50 welded to its upper cross section. The roof panel is welded to I-beam 52 via embeds in the roof panels, then the supporting W-shape steel I-beam 52 is welded to a cap plate 50 supported by tubular steel columns 53. Once the roof panels 62 are in place, adjacent roof panels are structurally connected with a weld plate 42 or rod 39 which is welded across embed plates 38 (see FIG. 26) set along the outside edge of adjacent roof panels.

Once a panel is in place and properly connected, it is ready to bear the design loads. Referring now to FIG. 22, the final interconnected structural assembly 63 of floor, roof, and walls is achieved primarily by welding aligned and adjoining floor, wall, and roof panel elements 60, 61, and 62, respectively, together horizontally, vertically, and/or inclined, or as other specified parts of a structure (not shown). After the structure 63 is fully erected and installed, all inter-panel joints are sealed with an elastic filler rod 46, non-shrink bonding cement mix 37, and an elastic joint sealer 49 as depicted in FIGS. 5 and 5A. All weld plate connections are filled with non-shrink bonding cement mix 37 to provide a smooth finished outer surface. The precast finished building structure 63 as connected is calculated to resist hurricane level wind forces.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A precast composite panel assembly comprising:
   a concrete slab;
   a wire mesh embedded in a planar arrangement within said slab;
   at least one steel I-beam having a top flange and bottom flange wherein the planar surface of said bottom flange is positioned flush with the top surface of said concrete slab;
   means for attaching said steel I-beam securely, inflexibly and rigidly within said concrete slab;
   at least one embedded plate fixedly positioned along each of two longitudinal opposing sides of said slab; and
   at least one displacement block fixedly positioned on top of each said embedded plate;
   whereby a unitary composite panel structure is formed.

2. A precise composite panel as in claim 1, wherein said means for attaching said I-beam comprises studs fixedly attached at intervals along said I-beam bottom flange and said studs being embedded within said concrete slab.

3. A precast composite panel as in claim 1, further including a reinforcement bar fixedly attached to each said embedded plate and planarly positioned to extend within the body of said slab.

4. A precast composite panel as in claim 1, wherein said concrete slab is substantially rectangular in shape.

5. A method of joining the precast composite concrete panels of claim 3 to form a stable wall structure, comprising the steps of:
   transporting and stabilizing hardened panels in the desired location and position on the site foundation;
   aligning said embedded plates of abutting panels;
   removing each said displacement block from said slab;
   fixedly attaching a weld plate over abutting embedded plates;
   fixedly attaching an L-bracket to said I-beam and to a studded base plate embedded within said foundation;
   inserting a backer rod between adjacent panels and filling the recess between said adjacent panels with sufficient elastic joint sealer to form a continuous and uniform surface;
   filling the recesses above said weld plates with a sufficient amount of bonding cement to form a continuous and uniform surface; and
   repeating the above steps until said wall is completely erected.

6. The method of claim 5, further including horizontally positioning and fixedly attaching a continuous perimeter tie-beam on top of said erected wall at the junction of the I-beam and said slab.

7. A method of producing a precast composite concrete panel assembly comprising the steps of:

a) providing a casting mold defined by a planar bottom and walls perpendicularly disposed thereon to confine concrete;
   b) positioning a wire mesh in horizontal planar arrangement within said casting mold;
   c) fixedly attaching embedded plates at intervals along the perimeter edge of said walls of said mold;
   d) positioning a displacement block atop each embedded plate;
   e) fixedly attaching studs at intervals along the bottom surface of one flange of an I-beam;
   f) positioning said I-beam atop said mold such that when the concrete is poured into said mold, said bottom surface of said I-beam flange will be flush with the concrete surface embedding said I-beam studs in said concrete;
   g) pouring concrete evenly into said mold;
   h) allowing said concrete to harden to form a precast composite concrete panel; and
   i) removing said panel from said mold.

8. The method of claim 7, further including positioning a pyramidal rod at the longitudinal junction of said walls and said bottom of said mold.

9. A precast composite panel as in claim 7, wherein said mold used for creating floor panels has a negative camber.

10. The method of producing the precast composite panel in claim 7, wherein said method is performed on the construction site and said casting mold is positioned on top of the building foundation, said foundation serving as the bottom of said mold, said method further including the steps of:
    applying a film of oil to said foundation surface; and
    positioning a stabilizing means along the outside perimeter of said mold.

11. A method for fabricating a hurricane resistant building on a foundation using composite precast panels, said method including the steps of:
    a) prefabricating a plurality of composite panels as in claim 3, each having dimensions appropriate for the wall, roof, or floor of said building to be erected;
    b) interconnecting a sufficient number of said panels substantially vertically on said foundation to form walls, horizontally and elevated atop said walls to form one or more upper floors of said building, and angularly or horizontally atop said walls to form a roof, said interconnections forming the structure comprising:
       positioning wall panels adjacent one another on a perimeter ledge of said foundation;
       bracing said adjacent panels to maintain the desired wall position;
       removing said displacement block from said slab;
       aligning adjacent embed plates of the adjacent wall panels;
       fixedly attaching a weld plate across adjacent embedded plates;
       attaching an L-bracket to the perimeter edge of said panel abutting said foundation, then fixedly attaching said L-bracket to a studded base plate embedded in said foundation;
       inserting a backer rod between the adjacent panels then filling the remaining space first with an elastic joint sealer to form a continuous level surface;
       filling the recesses above said weld plates with bonding cement to form a continuous level surface;

positioning a continuous perimeter tie-beam atop said vertically positioned wall panels and fixedly attaching said tie-beam to the columnar I-beams of said wall panels;

installing panels horizontally and planarly atop said perimeter tie-beam and fixedly attaching said panels to said tie-beam, to each other, and, where necessary, to weight-bearing structural steel framework inside said building so as to form a stable floor;

repeating the wall and floor connections to form upper floors of said building where indicated; and fixedly attaching panels to continuous perimeter tie-beams or preinstalled structural steel framework so as to form a roof.

12. The method of claim 11, wherein said preinstalled structural steel framework comprises steel I-beams and structural steel tubing and further includes the steps of:

vertically erecting then welding tubular steel columns to said embedded plates set in the foundation;

welding steel cap-plates atop said steel columns;

positioning I-beams atop said cap plates;

positioning and affixing panels to said I-beams by welding the shoe extending from the panel embedded I-beam onto the upper flange of said I-beam.

* * * * *